(12) United States Patent
Hopkins

(10) Patent No.: US 8,412,965 B2
(45) Date of Patent: Apr. 2, 2013

(54) PWM TIMER FOR POWER SUPPLY

(75) Inventor: Thomas L. Hopkins, Mundelein, IL (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 13/351,662

(22) Filed: Jan. 17, 2012

(65) Prior Publication Data

US 2012/0112814 A1 May 10, 2012

Related U.S. Application Data

(62) Division of application No. 12/507,661, filed on Jul. 22, 2009, now Pat. No. 8,140,870.

(51) Int. Cl.
*H03K 3/017* (2006.01)

(52) U.S. Cl. ........ 713/300; 713/320; 713/321; 713/322; 713/323; 713/324; 713/330; 713/340; 327/172; 327/173; 327/174; 327/175; 327/176

(58) Field of Classification Search .................. 713/300, 713/310, 320–324, 330, 340; 327/172–176
See application file for complete search history.

(56) References Cited

U.S. PATENT DOCUMENTS

| | | | | |
|---|---|---|---|---|
| 5,384,744 A | * | 1/1995 | Lee | 365/221 |
| 5,898,329 A | | 4/1999 | Hopkins | |
| 6,794,944 B2 | * | 9/2004 | Hirai | 331/1 A |
| 7,593,243 B2 | | 9/2009 | Ganev et al. | |
| 7,800,415 B2 | | 9/2010 | Yedevelly et al. | |
| 8,117,482 B2 | * | 2/2012 | Takata | 713/500 |
| 2002/0180540 A1 | * | 12/2002 | Hirai | 331/100 |
| 2004/0232964 A1 | | 11/2004 | Wiktor et al. | |
| 2006/0064609 A1 | | 3/2006 | Bryan | |
| 2009/0128202 A1 | * | 5/2009 | Takata | 327/151 |
| 2012/0102354 A1 | * | 4/2012 | Takata | 713/501 |

* cited by examiner

*Primary Examiner* — M Elamin
(74) *Attorney, Agent, or Firm* — Gardere Wynne Sewell LLP

(57) ABSTRACT

A forward converter circuit includes a transformer having a primary winding and a secondary winding. A first transistor is coupled in series with the primary winding and a second transistor is coupled in series with the secondary winding. A control circuit generating control signals for controlling operation of the first and second transistors. The control signals are generated responsive to the values in certain triggered counting circuits satisfying programmable thresholds.

20 Claims, 13 Drawing Sheets

PWM TIMER FOR POWER SUPPLY

CROSS-REFERENCE TO RELATED APPLICATION

This application is a divisional application from U.S. Application for patent Ser. No. 12/507,661 filed Jul. 22, 2009, now U.S. Pat. No. 8,140,870, the disclosure of which is hereby incorporated by reference.

BACKGROUND

1. Technical Field

The present invention relates generally to digital power supplies and, more particularly, to a pulse width modulated (PWM) timer for use in a digital power supply.

2. Description of Related Art

Forward power converters are well known in the art. These converters include a plurality of transistors each with a control terminal. Control signals are supplied to the control terminals with a certain relationship to each other in order to properly operate the converter. It is critical that the timing of operation of the transistors be carefully controlled. Timing circuits of varying types have been used to generate the control signals.

For example, the STM32 MCU from STMicroelectronics has been used to generate the control signals in a power converter application. The STM32 device is designed and optimized for three-phase motor control. As such, the circuit architecture is configured to control a three-phase bridge, and more specifically to control three half bridges. This bridge architecture shares some similarities with the power converter architecture, and further shares some PWM control similarities with power converter circuits.

While a motor controller needs to control only two transistors in a half bridge, the control operation for a power converter is more complex. In a single phase power converter, for example, two transistors must be controlled on the primary side, and one or more additional transistors must be controlled on the secondary side in order to achieve synchronous rectification. In addition, if one desires to implement current control in addition to voltage control, one of the controlled switching events in the power converter must be triggered by a current detection (and not by the digital PWM generator).

To address the power converter control and timing needs, the timers provided by the STM32 MCU have been used to generate the transistor control signals. However, because the STM32 is designed for motor control and not power converter control, the use of the STM32 as the power converter control circuit is not optimized. A need exists for a control circuit having optimized timers. Such a control circuit should support the use of programmable delays between the transistor control signals.

SUMMARY

A forward converter circuit may include a transformer having a primary winding and a secondary winding, a first transistor coupled in series with the primary winding and a second transistor coupled in series with the secondary winding, the first transistor having a first control terminal and the second transistor having a second control terminal; and a control circuit generating a first control signal for application to the first control terminal and generating a second control signal for application to the second control terminal.

A control circuit in an embodiment (used, for example, to control the forward converter circuit) comprises: a first delay timer triggered by a first event signal to count; a second delay timer trigger by a second event signal to count; a first comparator for comparing the count of the first delay timer to a first threshold and cause a state change of the first control signal; a second comparator for comparing the count of the second delay timer to a second threshold and cause an opposite state change of the first control signal; a third comparator for comparing the count of the first delay timer to a third threshold and cause a state change of the second control signal; and a fourth comparator for comparing the count of the second delay timer to a fourth threshold and cause an opposite state change of the second control signal.

A control circuit in another embodiment (used, for example, to control the forward converter circuit) comprises: a first comparator for comparing a first count value to a programmable first threshold and cause a state change of the first control signal in response thereto; a second comparator for comparing a second count value to a programmable second threshold and cause an opposite state change of the first control signal in response thereto; a third comparator for comparing the first count value to a programmable third threshold and cause a state change of the second control signal in response thereto; and a fourth comparator for comparing the second count value to a programmable fourth threshold and cause an opposite state change of the second control signal in response thereto.

A control circuit in another embodiment (used, for example, to control the forward converter circuit) comprises: a first delay timer triggered by a first event signal to count and cause a state change of the first control signal; a second delay timer triggered by a second event signal to count and cause an opposite state change of the first control signal; a third delay timer triggered by a third event signal to count and cause a state change of the second control signal; and a fourth delay timer triggered by a fourth event signal to count and cause an opposite state change of the second control signal.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1A:
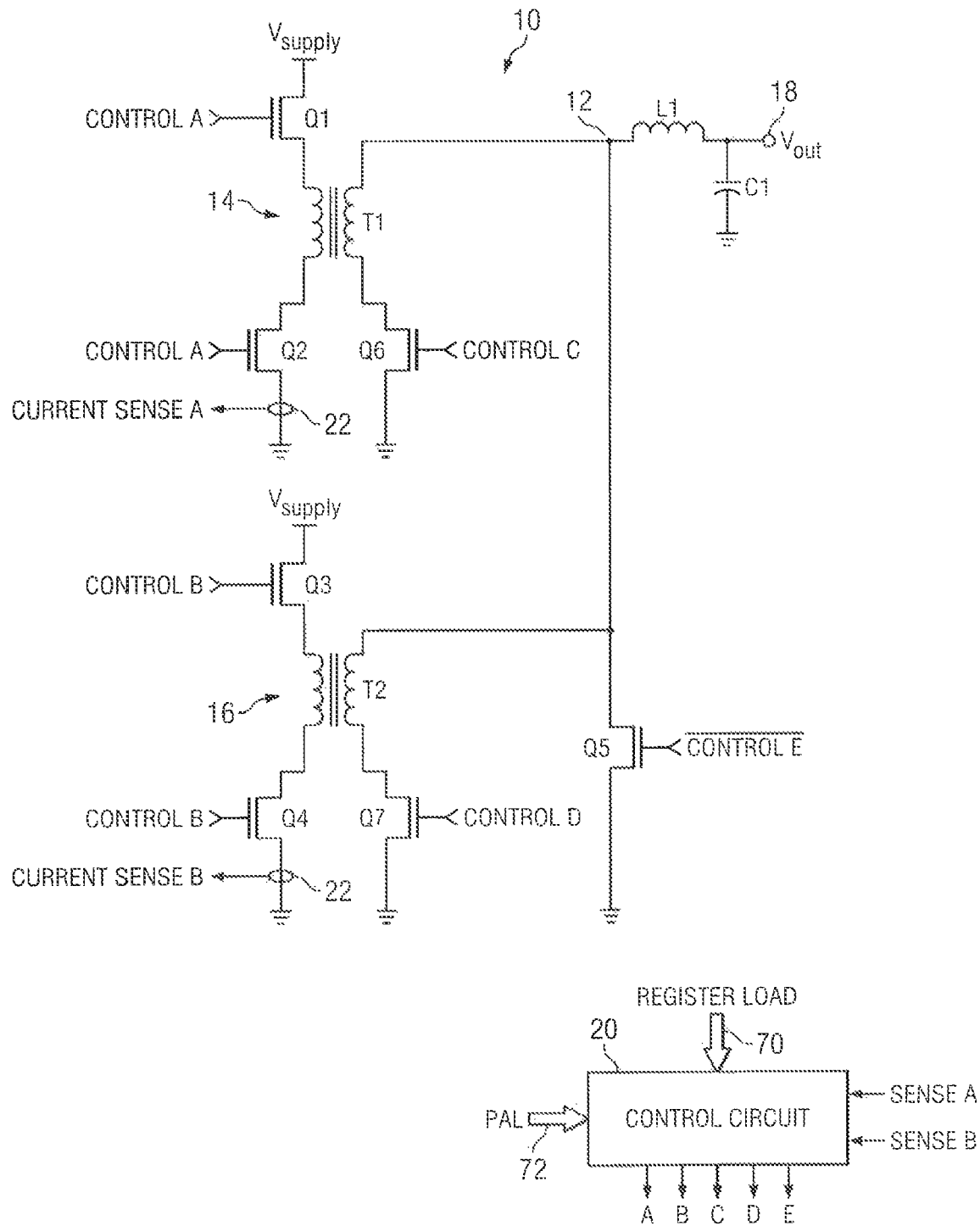
FIGS. 1A and 1B are schematic diagrams of power stage embodiments.

Reference is now made to FIG. 1A which shows a schematic diagram of a power stage 10. The power stage 10 receives a supply voltage Vsupply and outputs an output voltage Vout. The supply voltage Vsupply may be generated in any suitable manner from any suitable source and is, in one implementation, a high voltage on the order of greater than +300V (obtained, for example, by doubling and rectifying a 115V supply). The output voltage Vout is, relative to the supply voltage Vsupply, a low voltage on the order of about +12V with an average current of about 8 A. It will be understood, however, that a step down converter is not the only implementation within the scope of the present invention. The invention may also be applicable to the control of a step up converter.

The supply voltage Vsupply is applied to the drain of an nMOS transistor Q1. The gate of nMOS transistor Q1 receives a control signal CONTROL A. The source of that nMOS transistor Q1 is coupled to a first terminal of a primary winding of transformer T1. A second terminal of the primary winding of transformer T1 is coupled to the drain of an nMOS transistor Q2 whose source is coupled to a ground reference. The gate of nMOS transistor Q2 also receives the control signal CONTROL A. The secondary winding of transformer T1 includes a first terminal coupled to node 12 and a second terminal coupled to the drain of an nMOS transistor Q6 whose source is coupled to the ground reference to form an active rectification path. The gate of nMOS transistor Q6 receives a control signal CONTROL C. The foregoing circuitry forms a first forward converter circuit 14.

The supply voltage Vsupply is applied to the drain of an nMOS transistor Q3. The gate of nMOS transistor Q3 receives a control signal CONTROL B. The source of that nMOS transistor Q3 is coupled to a first terminal of a primary winding of transformer T2. A second terminal of the primary winding of transformer T2 is coupled to the drain of an nMOS transistor Q4 whose source is coupled to a ground reference. The gate of nMOS transistor Q4 also receives the control signal CONTROL B. The secondary winding of transformer T2 includes a first terminal coupled to node 12 and a second terminal coupled to the drain of an nMOS transistor Q7 whose source is coupled to the ground reference to form an active rectification path. The gate of nMOS transistor Q7 receives a control signal CONTROL D. The foregoing circuitry forms a second forward converter circuit 16.

The outputs of the first and second forward converter circuits 14 and 16 are summed at node 12. An inductor L1 is coupled between node 12 and the output node 18 which supplies the output voltage Vout. A capacitor C1 is coupled between the output node 18 and the ground reference. The drain of an nMOS transistor Q5 is coupled to node 12. The source of that nMOS transistor Q5 is coupled to the ground reference to form a recirculation path. The gate of nMOS transistor Q5 receives a control signal CONTROL E (bar). In this configuration, the transistor Q5 is generally coupled in parallel with the secondary windings of both transformers T1 and T2.

The two phase, two transistor forward converter power stage 10 shown in FIG. 1A needs at least five control signals, comprising two control signals on the primary side of transformers T1 and T2 (namely, CONTROL A and CONTROL B) and three control signals on the secondary side of transformers T1 and T2 (namely, CONTROL C, CONTROL D and CONTROL E). The power stage 10 operates properly only if the control signals CONTROL A to CONTROL E are properly and timely generated.

The two control signals CONTROL A and CONTROL B on the primary side of transformers T1 and T2 control the transistors Q1-Q4 to be turned on at a fixed frequency and phase relationship. These transistors, however, may be turned off in response to a current sensing event (it being understood that the converter can be operated in: a) constant voltage mode where turn on/off is controlled by timing; or b) current mode where turn on is timed and turn off is controlled by detecting peak current). The three control signals on the secondary side of transformers T1 and T2 control the transistors Q5-Q7 to be turned on also at a fixed frequency and phase relationship. These transistors, however, are also turned off in relation to a delay time. There must also be provided a dead time between the synchronous rectification transistors Q6 and Q7 in the active path and the transistor Q5 in the recirculation path.

A control circuit 20 is provided to generate the control signals CONTROL A to CONTROL E with the proper timing and relationship. The control circuit 20 may be implemented in any suitable manner and is preferably a circuit supporting programmable timing operations. The control circuit receives current sensing inputs (SENSE A and SENSE B). The signals on the current sensing inputs SENSE A and SENSE B represent sensed current flowing on the primary side of transformers T1 and T2, respectively. An appropriate current sensor 22 is provided in the current path of the primary side of each of transformers T1 and T2 to generate the current sensing inputs SENSE A and SENSE B. The current sensor 22 may, for example, comprise a transformer coupled in series with the source of each of transistors Q2 and Q4. The transistor Q5 in FIG. 1A is shown receiving the signal CONTROL E (bar) in order to illustrate that it is controlled out of phase with respect to the other control signals. It will, of course, be understood that the control circuit 20 can be configured to provide complementary state control signals as needed.

Figure 2A:
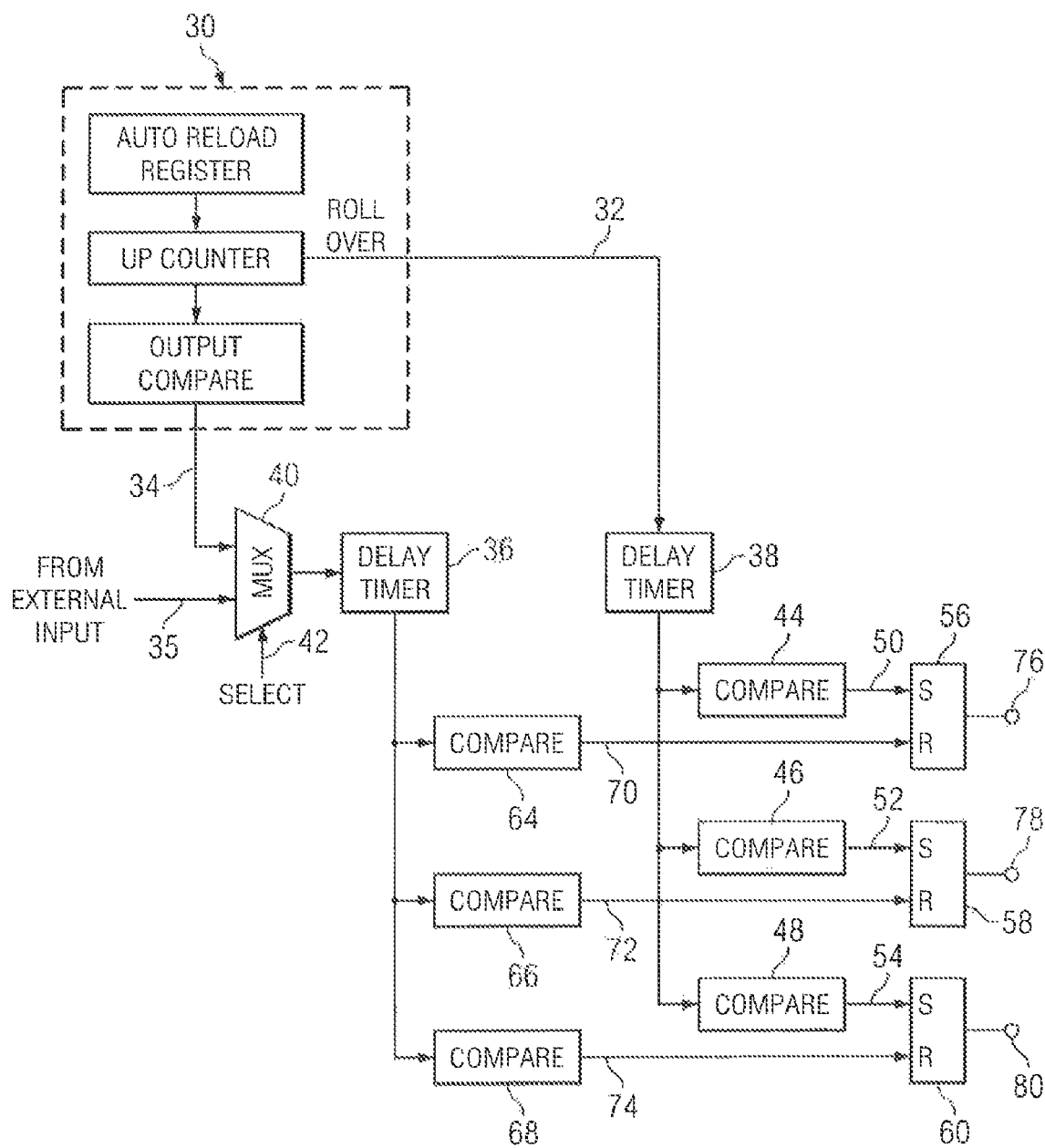
FIGS. 2A and 2B are block diagrams of a general timer control circuit.

Reference is now made to FIG. 2A which illustrates a block diagram of a general timer control circuit. Such a general timer control circuit could form the functional basis of the control circuit 20 in FIG. 1A.

A combination autoreload register, up counter and comparator circuit 30 functions to generate a first event (pulse) 32 when the up counter rolls over and to generate a second event (pulse) 34 when the value of the up counter equals a compare register value. An external event (pulse) 35 may also be received. This external event (pulse) 35 may, for example, be generated by a current comparison circuit (not explicitly shown) which compares the received current sensing inputs SENSE A and/or SENSE B to a threshold. The events (pulses) 32-35 are used to trigger (i.e., start) delay timers 36 and 38. Since there are two delay timers 36 and 38 and three events (pulses) 32-35, a multiplexer 40 responsive to a selection signal 42 is used to select whether the second event (pulse) 34 or the external event (pulse) 35 is passed to trigger operation of the delay timer 36. When a delay timer 36 or 38 is triggered (by an event pulse), the delay timer will count up from zero to its maximum count value, roll back to zero, and then stop. The same clock is used to feed the up counter and the delay timers. There may, if desired, be some prescaling with respect to the applied clock.

A first set of comparators 44, 46 and 48 are coupled to receive the output timer value from the delay timer 38. Each comparator 44, 46 and 48 includes a compare register programmed with a comparison threshold value. The comparators 44, 46 and 48 compare the received output timer value to their programmed threshold and generate a set event (pulse) 50, 52 and 54 when the programmed threshold is met. Each set event (pulse) output is applied to the set input of a corresponding one of the included set/reset flip flops (latches) 56, 58 and 60 (which could alternatively be J/K type flip flops or other latching type circuits).

A second set of comparators 64, 66 and 68 are coupled to receive the output timer value from the delay timer 36. Each comparator 64, 66 and 68 includes a compare register programmed with a comparison threshold value. The comparators 64, 66 and 68 compare the received output timer value to their programmed threshold and generate a reset event (pulse) 70, 72 and 74 when the programmed threshold is met. Each reset event (pulse) output is applied to the reset input of a corresponding one of the included set/reset flip flops (latches) 56, 58 and 60.

The output 76 of set/reset flip flop 56 is set in response to set event (pulse) 50 and reset in response to reset event (pulse) 70. The output 78 of set/reset flip flop 58 is set in response to set event (pulse) 52 and reset in response to reset event (pulse) 72. The output 80 of set/reset flip flop 60 is set in response to set event (pulse) 54 and reset in response to reset event (pulse) 74. Thus, it will be recognized that the circuit configuration of FIG. 2A generates three outputs 76, 78 and 80 that have phase relationships controlled by the delay timers 36 and 38 and the programmed thresholds in the comparators 44, 46, 48, 64, 66 and 68. An XOR gate (not shown) could be added to any or all of the three outputs 76, 78 and 80 to enable selection of inverted or non-inverted output signals with respect to set/reset logic state. This would, for example, facilitate the generation of the CONTROL E (bar) signal as discussed above.

With application to the control circuit 20 of FIG. 1A, the two delay timers 36 and 38 can be associated with two distinct switching events, for example, the turning on and off of the switches on the primary and secondary sides of a transformer. Additionally, any arbitrary phase shift can be generated between the three output signals 76, 78 and 80 in response to the two input events monitored by the two delay timers 36 and 38. For example, in voltage mode, the two events could be the PWM signal generated by the counter timer (control signal 42 configured to select the counter event 34 for input to timer 36). In current mode, the leading event would be from the timer and the trailing event would be from the current sensor (control signal 42 configured to select the current sense event 35 for input to timer 36).

Figure 3:
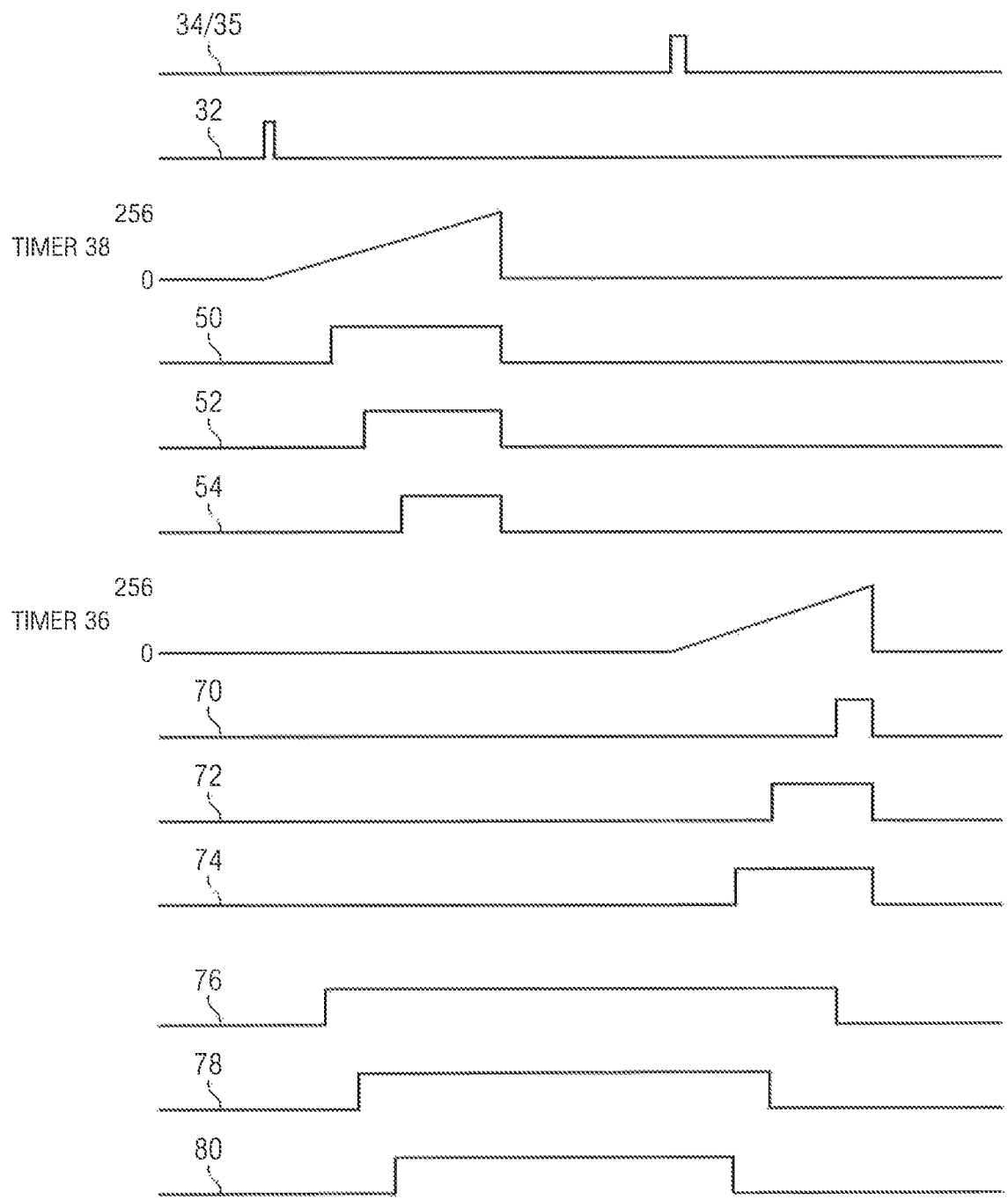
FIG. 3 is a timing diagram illustrating an exemplary operation of the circuit shown in FIG. 2A or 2B.

Reference is now made to FIG. 3 which shows a timing diagram illustrating an exemplary operation of the circuit shown in FIG. 2A. The signal 32 triggers delay timer 38 to begin counting. When the count value reaches the threshold programmed into comparator 44, the set event (pulse) 50 changes state and this causes the flip flop 56 to change the state of output 76. When the count value reaches the threshold programmed into comparator 46, the reset event (pulse) 52 changes state and this causes the flip flop 58 to change the state of output 78. When the count value reaches the threshold programmed into comparator 48, the reset event (pulse) 54 changes state and this causes the flip flop 60 to change the state of output 80. The reset events (pulses) 50, 52 and 54 return to their original states when the delay timer 38 counts out and is reset to zero.

The signal 34/35 (as selected by signal 42) then triggers delay timer 36 to begin counting first. When the count value reaches the threshold programmed into comparator 64, the reset event (pulse) 70 changes state and this causes the flip flop 56 to change the state of output 76. When the count value reaches the threshold programmed into comparator 66, the reset event (pulse) 72 changes state and this causes the flip flop 58 to change the state of output 78. When the count value reaches the threshold programmed into comparator 68, the reset event (pulse) 74 changes state and this causes the flip flop 60 to change the state of output 80. The reset events (pulses) 70, 72 and 74 return to their original states when the delay timer 36 counts out and is reset to zero.

The waveforms and relative timing illustrated in FIG. 3 are exemplary in nature. It will be understood that with appropriate programming of the threshold values of the various included counters that any arbitrary waveforms and timing relationships can be generated. It can thus be appreciated how a control circuit of the type shown in FIG. 2A can be used in any number of timing control implementations, including for the control circuit 20 of the power stage 10 in FIG. 1A.

Figure 4A:
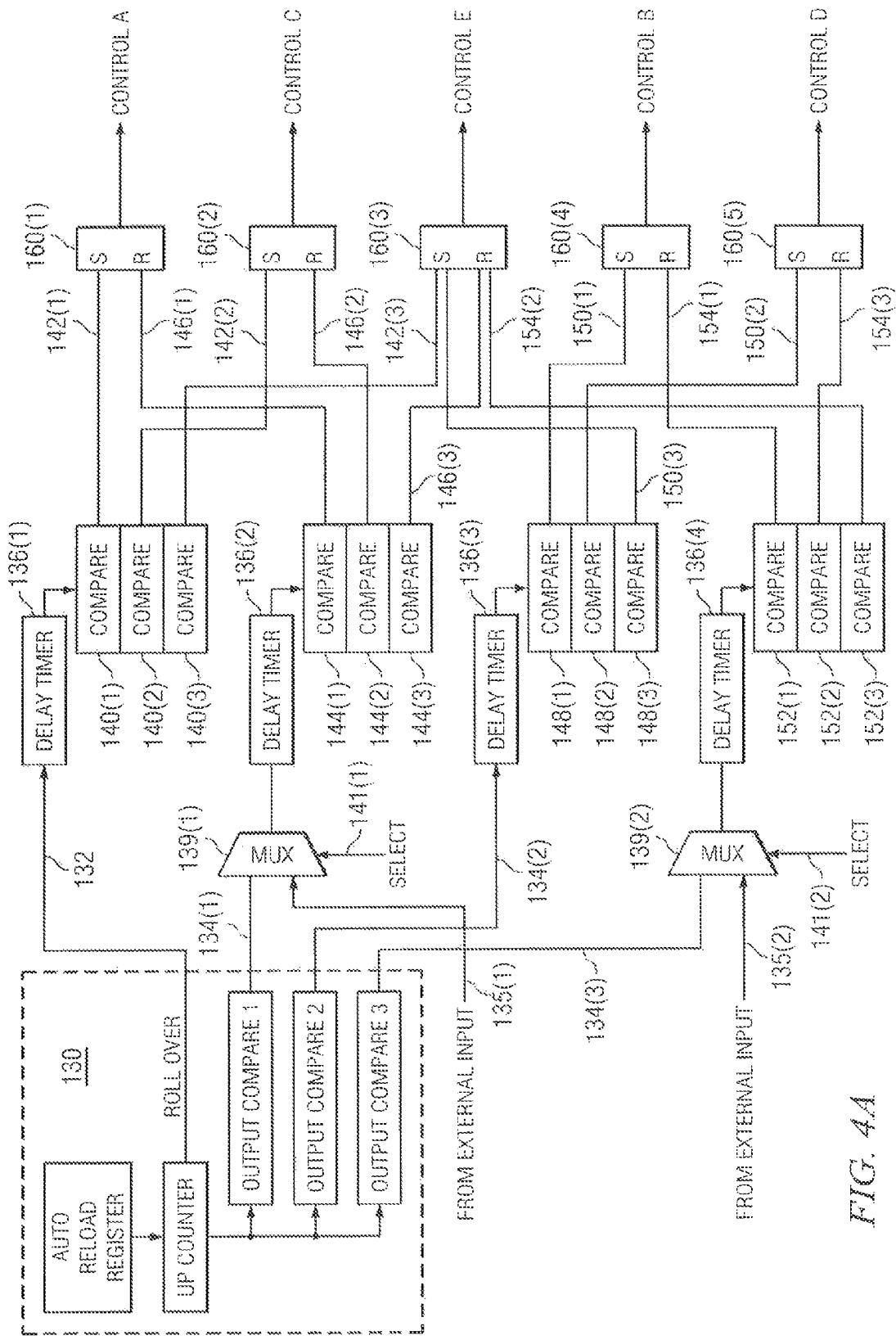
FIG. 4A is a block diagram of a first embodiment timer control circuit for use in the power stage of FIG. 1A.

Reference is now made to FIG. 4A wherein there is shown a block diagram of a first embodiment timer control circuit for use in the power stage of FIG. 1A. This circuit has a configuration similar to, but more complicated than, that shown in FIG. 2A. The two phase, two transistor forward converter power stage 10 shown in FIG. 1A needs at least five control signals, comprising two control signals on the primary side of transformers T1 and T2 (namely, CONTROL A and CONTROL B) and three control signals on the secondary side of transformers T1 and T2 (namely, CONTROL C, CONTROL D and CONTROL E). The circuit shown in FIG. 4A generates those required control signals with the desired timing relationships.

A combination autoreload register, up counter and multi-comparator circuit 130 functions to generate a first event (pulse) 132 when the up counter rolls over; generate a second event (pulse) 134(1) when the value of the up counter equals a first compare register value; generate a third event (pulse) 134(2) when the value of the up counter equals a second compare register value; and generate a fourth event (pulse) 134(3) when the value of the up counter equals a third compare register value. External events (pulses) 135(1) and 135(2) may also be received. These external event (pulses) 135(1) and 135(2) may, for example, be generated by a current comparison circuit (not explicitly shown) which compares the received current sensing inputs SENSE A and SENSE B to one or more thresholds. The events (pulses) 132, 134(1)-134(3) and 135(1)-135(2) are used to trigger (i.e., start) a plurality of delay timers 136(1)-136(4).

A first multiplexer 139(1) responsive to a selection signal 141(1) is used to select whether the second event (pulse) 134(1) or the external event (pulse) 135(1) is passed to trigger operation of the second delay timer 136(2). A second multiplexer 139(2) responsive to a selection signal 141(2) is used to select whether the fourth event (pulse) 134(3) or the external event (pulse) 135(2) is passed to trigger operation of the fourth delay timer 136(4). In some configurations the external event (pulse) 135(1) and the external event (pulse) 135(2) may be the same signal.

When a delay timer 136(1)-136(4) is triggered (by an event pulse), the delay timer will count up from zero to its maximum count value, roll back to zero, and then stop. The same clock is used to feed the up counter and the delay timers. There may, if desired, be some prescaling with respect to the applied clock.

The circuit of FIG. 4A is provided with a set/reset flip flop (latch) 160 for each one of the five control signals (wherein the S/R flip flops could alternatively be J/K type flip flops or other latching type circuits). A first set/reset flip flop 160(1) provides the CONTROL A signal. A second set/reset flip flop 160(2) provides the CONTROL C signal. A third set/reset flip flop 160(3) provides the CONTROL E signal. A fourth set/reset flip flop 160(4) provides the CONTROL B signal. A fifth set/reset flip flop 160(5) provides the CONTROL D signal.

A first set of comparators 140(1)-140(3) are coupled to receive the output timer value from the first delay timer 136(1). Each comparator 140(1)-140(3) includes a compare register programmed with a comparison threshold value. Each of the comparators 140(1)-140(3) compares the received the output timer value to its programmed threshold and generates a corresponding event (pulse) 142(1)-142(3) when the programmed threshold is met. Each event (pulse) output is applied to one of the flip flops 160. Specifically, the event (pulse) 142(1) from comparator 140(1) is applied to the set input of flip flop 160(1), the event (pulse) 142(2) from comparator 140(2) is applied to the set input of flip flop 160(2), and the event (pulse) 142(3) from comparator 140(3) is applied to the set input of flip flop 160(3).

A second set of comparators 144(1)-144(3) are coupled to receive the output timer value from the second delay timer 136(2). Each comparator 144(1)-144(3) includes a compare register programmed with a comparison threshold value. Each of the comparators 144(1)-144(3) compares the received the output timer value to its programmed threshold and generates a corresponding event (pulse) 146(1)-146(3) when the programmed threshold is met. Each event (pulse) output is applied to one of the flip flops 160. Specifically, the event (pulse) 146(1) from comparator 144(1) is applied to the reset input of flip flop 160(1), the event (pulse) 146(2) from comparator 144(2) is applied to the reset input of flip flop 160(2), and the event (pulse) 146(3) from comparator 144(3) is applied to the reset input of flip flop 160(3).

A third set of comparators 148(1)-148(3) are coupled to receive the output timer value from the third delay timer 136(3). Each comparator 148(1)-148(3) includes a compare register programmed with a comparison threshold value. Each of the comparators 148(1)-148(3) compares the received the output timer value to its programmed threshold and generates a corresponding event (pulse) 150(1)-150(3) when the programmed threshold is met. Each event (pulse) output is applied to one of the flip flops 160. Specifically, the event (pulse) 150(1) from comparator 148(1) is applied to the set input of flip flop 160(4), the event (pulse) 150(2) from comparator 148(2) is applied to the set input of flip flop 160(5), and the event (pulse) 150(3) from comparator 148(3) is applied to the set input of flip flop 160(3).

A fourth set of comparators 152(1)-152(3) are coupled to receive the output timer value from the fourth delay timer 136(4). Each comparator 152(1)-152(3) includes a compare register programmed with a comparison threshold value. Each of the comparators 152(1)-152(3) compares the received the output timer value to its programmed threshold and generates a corresponding event (pulse) 154(1)-154(3) when the programmed threshold is met. Each event (pulse) output is applied to one of the flip flops 160. Specifically, the event (pulse) 154(1) from comparator 152(1) is applied to the reset input of flip flop 160(4), the event (pulse) 154(2) from comparator 152(2) is applied to the reset input of flip flop 160(5), and the event (pulse) 154(3) from comparator 152(3) is applied to the reset input of flip flop 160(3).

In operation, the Output Compare 2 register in the combination autoreload register, up counter and multi-comparator circuit 130 is preferably set to one-half of the rollover value for the Up Counter. With this setting, the two transistors will be set to switch 180 degrees out of phase with each other. The flip flop 160(3) generating the CONTROL E signal for the recirculating path includes two set and two reset inputs. One set/reset input pair receives event (pulse) signals from the circuitry which generates the timing of the CONTROL A signal. Another set/reset input pair receives event (pulse) signals from the circuitry which generates the timing of the CONTROL B signal. This circuit configuration ensures that the CONTROL E signal turns off the recirculating path (transistor Q5) whenever one of the transistors on the primary side of transformers T1 and T2 is turned on by the CONTROL A and CONTROL B signals.

The circuitry of FIG. 4A allows for the digital generation of two independently controlled PWM signals, or the generation of two coordinated PWM signals whose outputs are out of phase with each other. This is accomplished by loading the proper programmed threshold values into the various comparator registers. With reference to FIG. 1A, the control circuit 20 further includes a register load input 70 through which the threshold values are input and stored in the comparator registers. This loading of threshold values allows the user to set the phase relationship between the primary side transistor(s), the secondary side transistor(s) for the active path synchronous rectification, and the transistor for the recirculation path synchronous rectification.

Figure 4B:
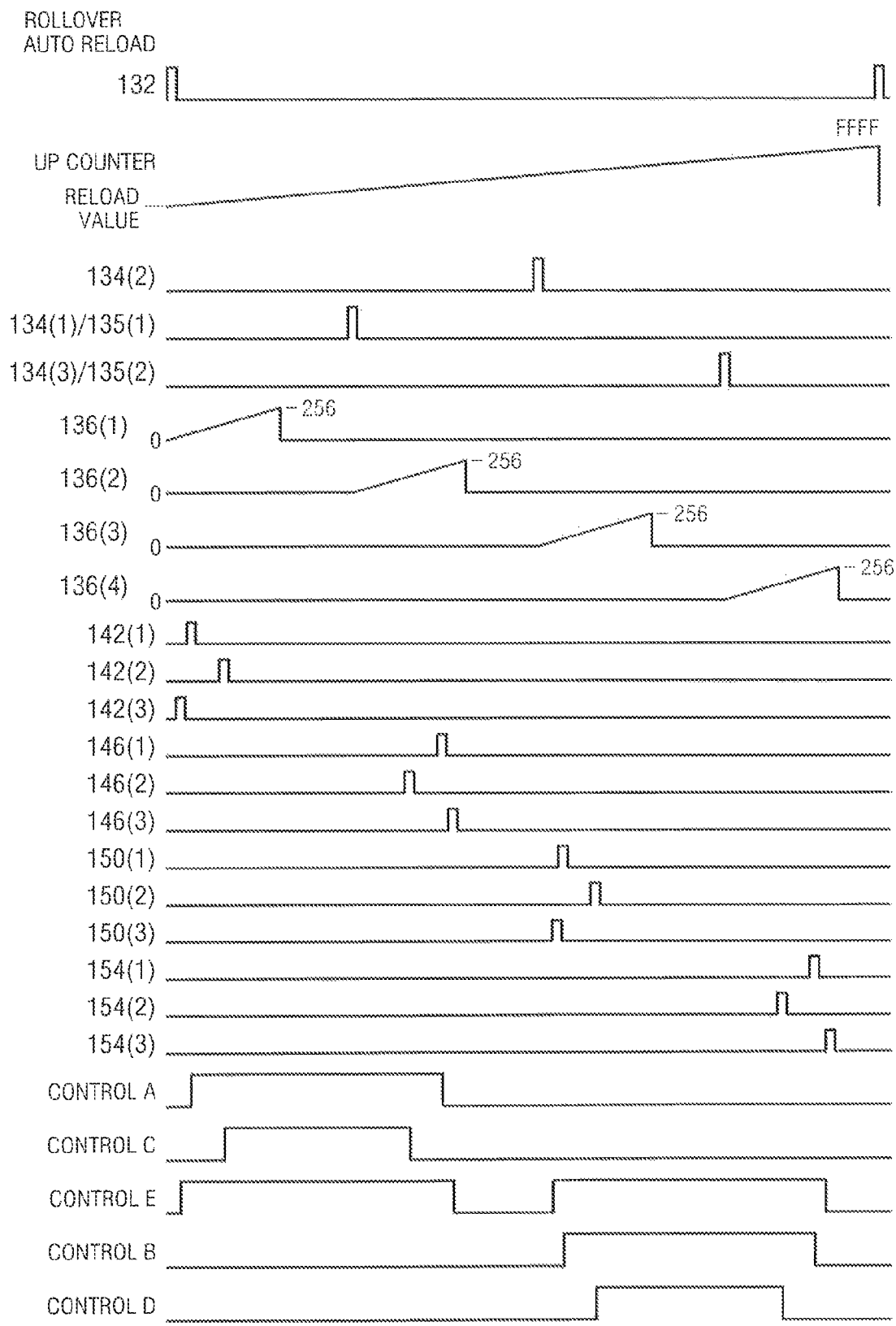
FIG. 4B is a timing diagram illustrating an exemplary operation of the circuit shown in FIG. 4A.

FIG. 4B shows a timing diagram illustrating an exemplary operation of the circuit shown in FIG. 4A.

The circuit of FIG. 4A has hard-wired connections with respect to the event pulse signals between the comparators and flip flops. Thus, the relationships between the various delay timers, their associated comparators, and the connected flip flops are fixed. There would be an advantage if a more flexible relationship between these circuit components could be provided. The implementation of FIG. 5 addresses this need.

Figure 5:
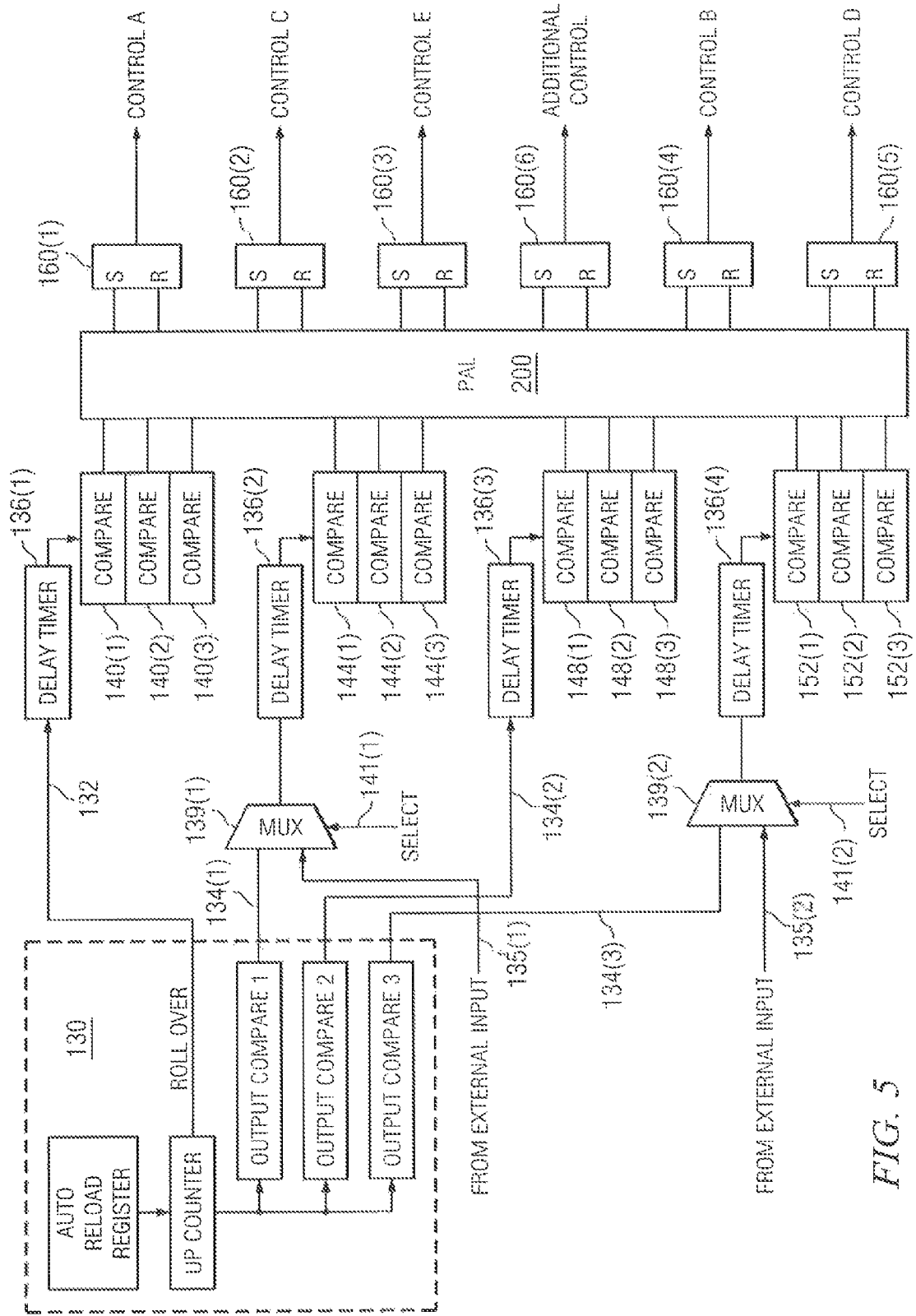
FIG. 5 is a block diagram of a second embodiment timer control circuit for use in the power stage of FIG. 1A.

The circuit shown in FIG. 5 is similar to that shown in FIG. 4A except that the specific interconnections provided by the event (pulse) signals between the comparators and flip flops are flexibly configured through the use of a programmable array logic (PAL) circuit 200. The PAL 200 provides a configuration wherein each set and reset input to a flip flop 160 has an associated OR term. The set or reset input to the flip flop 160 would then be the logical OR of each of the inputs selected in the array logic. This configuration is a little different that typical PAL configurations which provide an AND/OR array allowing the input to be the logical OR of several AND terms from the array.

The PAL 200 configuration provides a greater degree of flexibility and further would support the provision of additional flip flops such as the flip flop 160(6) shown generating an ADDITIONAL CONTROL signal. This ADDITIONAL CONTROL signal could be configured through the timers and comparators to have a relationship that is either independent from or coordinated with the control signals provided by the other flip flops 160. For example, this additional control could be used to provide two independent output voltages.

The programming of the PAL 200 within the control circuit 20 can be accomplished by loading configuration data through a PAL configuration input 72 (see, FIG. 1A). This configuration data would set the logical OR relationships between the signals output from the comparators and the set and reset signals applied to the flip flops 160. The set relationship could, for example, implement the circuit interconnections of the fixed circuit shown in FIG. 4A. Alternatively, the configuration data could set a different relationship and provide different circuit interconnections.

Figure 6A:
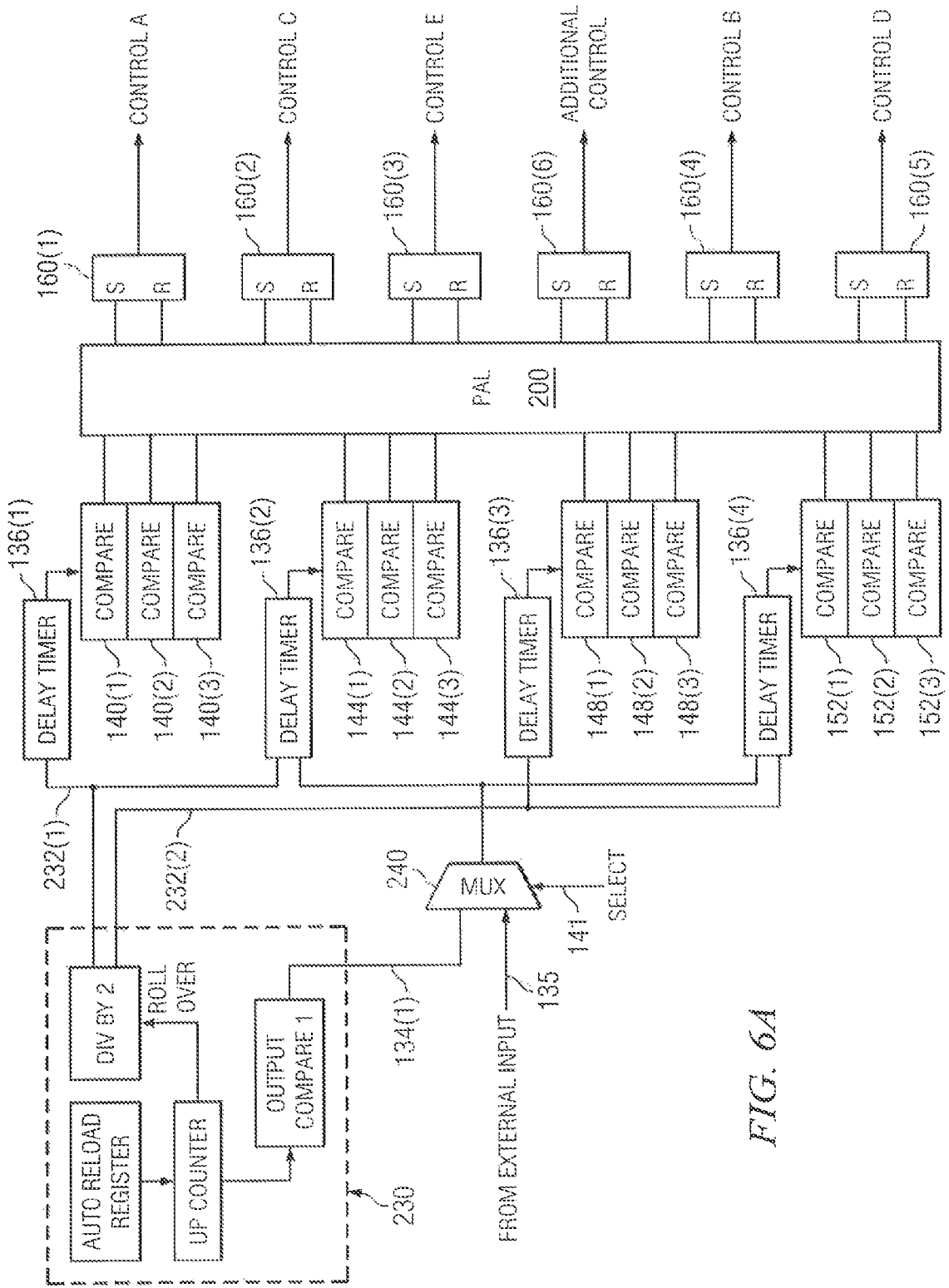
FIG. 6A is a block diagram of a third embodiment timer control circuit for use in the power stage of FIG. 1A.

Reference is now made to FIG. 6A which shows a block diagram of a third embodiment timer control circuit for use in the power stage of FIG. 1A. The circuit shown in FIG. 6A is similar to that shown in FIG. 5 except for the use of a combination autoreload register, up counter and comparator circuit 230 having a configuration different from that of the circuit 130 shown in FIG. 5. The circuit 230 further includes a divide by two counter having two output event (pulse) signals 232(1) and 232(2) which are 180 degrees out of phase from each other. The first signal 232(1) is applied to the first and second delay timers 136(1) and 136(2). The second signal 232(2) is applied to the third and fourth delay timers 136(3) and 136(4). The second event (pulse) 134(1) is generated when the value of the up counter equals a first compare register value. The external event (pulse) 135, generated by a current comparison circuit (not explicitly shown) which compares the received current sensing inputs SENSE A and SENSE B to a threshold, is applied with the second event (pulse) 134(1) to the inputs of the multiplexer 240. Selection by the multiplexer 240 between the two signals is made in response to the selection signal 142. Thus, one of the second event (pulse) 134(1) or external event (pulse) 135 is applied to the second and fourth delay timers 136(2) and 136(4).

Figure 1B:
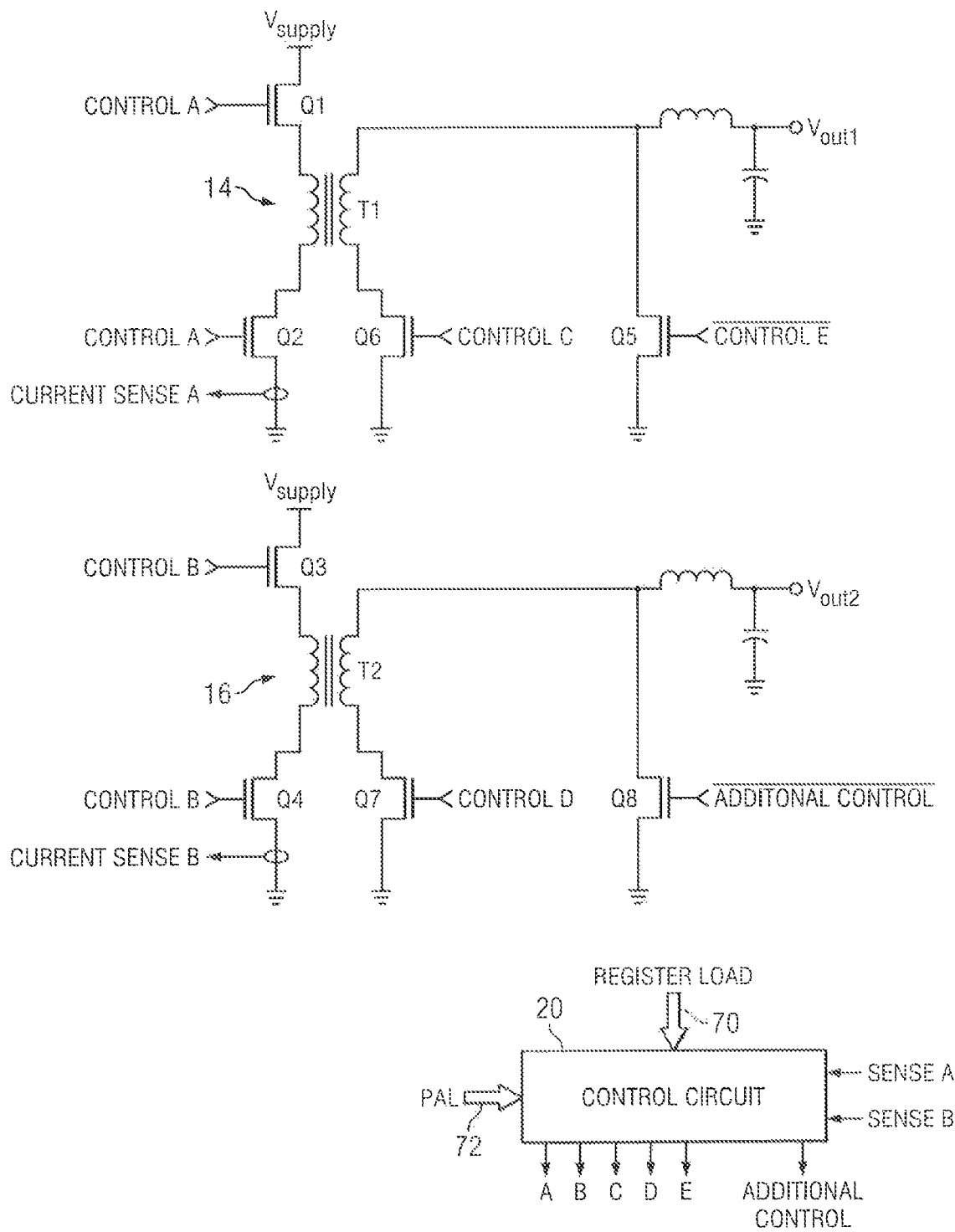

The circuit shown in FIG. 6A advantageously provides two outputs which are exactly 180 degrees out of phase and which have the same duty cycle (in voltage mode). A disadvantage of the FIG. 6A implementation is that it is limited in operation to controlling a two-phase system like that shown in FIG. 1A. If the forward converter instead is configured to include two independent stages (such as shown in FIG. 1B), the circuit configuration of FIG. 7 may instead be used.

Although FIG. 6A shows the use of a PAL 200 defining interconnections between the comparators and the flip flops, it will be understood that a hardwired circuit interconnection like that shown in FIG. 4A could alternatively be used.

Figure 6B:
FIG. 6B is a timing diagram illustrating an exemplary operation of the circuit shown in FIG. 6A.
Figure 6B:
Figure 6B:
Figure 6B:
Figure 6B:
Figure 6B:
Figure 6B:
Figure 6B:
Figure 6B:
Figure 6B:
Figure 6B:
Figure 6B:
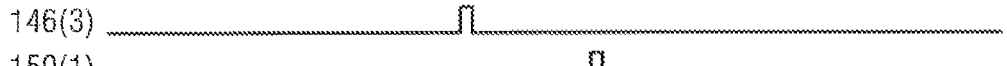
Figure 6B:
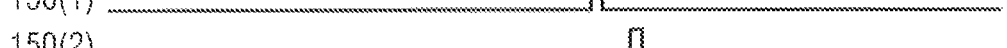
Figure 6B:
Figure 6B:
Figure 6B:
Figure 6B:
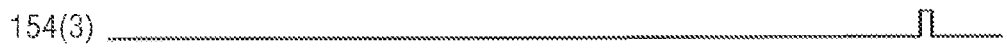
Figure 6B:
Figure 6B:
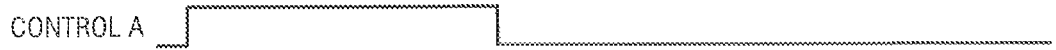
Figure 6B:
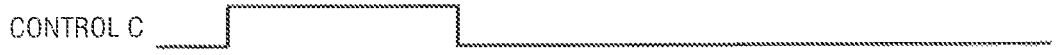
Figure 6B:
Figure 6B:
Figure 6B:
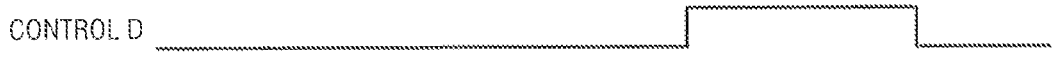

FIG. 6B shows a timing diagram illustrating an exemplary operation of the circuit shown in FIG. 6A.

Figure 7:
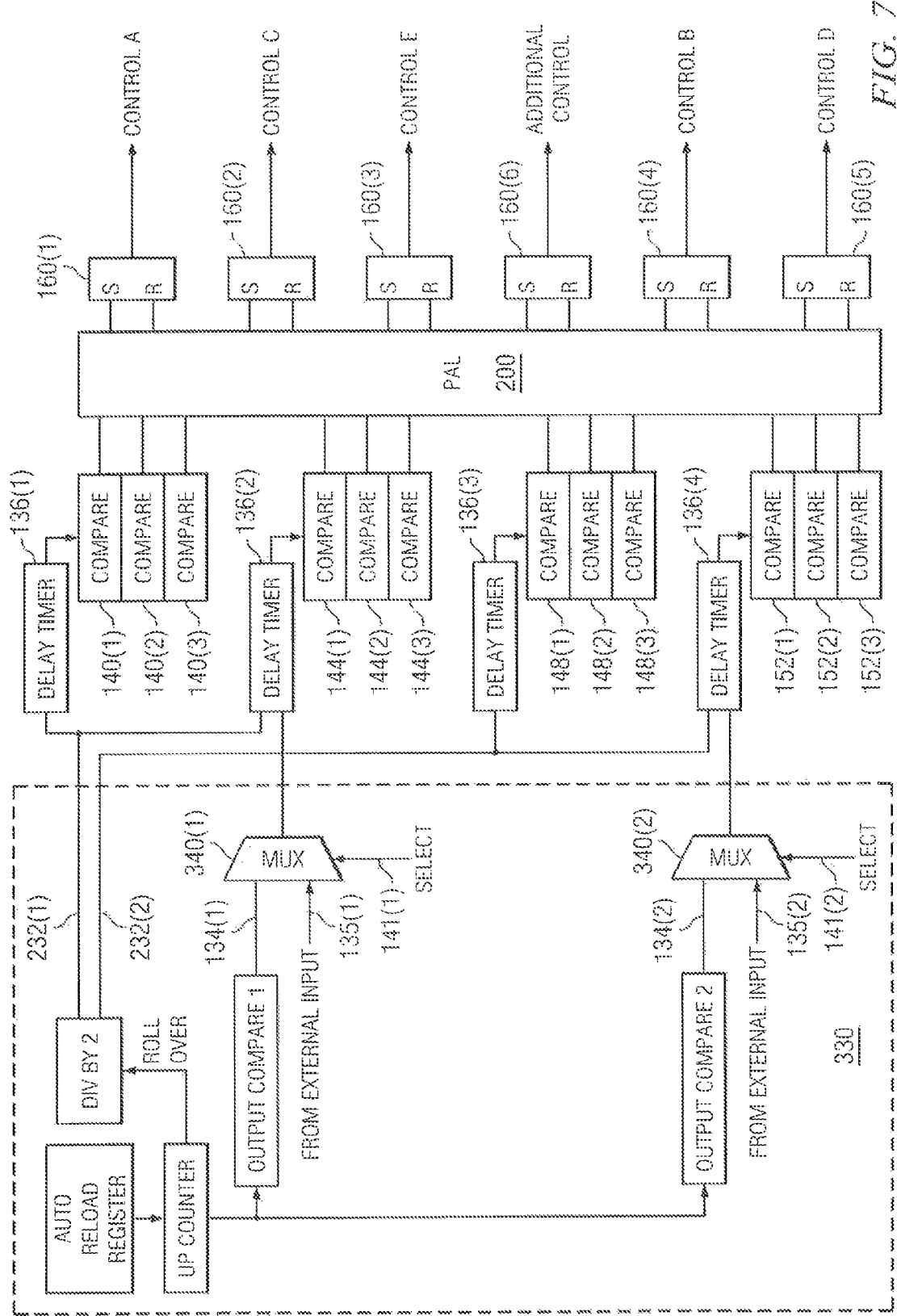
FIG. 7 is a block diagram of a fourth embodiment timer control circuit for use in a power stage having two independent forward conversion stages as in FIG. 1B.

Reference is now made to FIG. 7 which shows a block diagram of a fourth embodiment timer control circuit for use a power stage including two independent forward conversion stages. The circuit shown in FIG. 7 is similar to that shown in FIG. 6A except for the use of a combination autoreload register, up counter and comparator circuit 330 having a configuration different from that of the circuit 230 shown in FIG. 6A. The circuit 330 includes a divide by two counter having two output event (pulse) signals 232(1) and 232(2) which are 180 degrees out of phase from each other. The first signal 232(1) is applied to the first and second delay timers 136(1) and 136(2). The second signal 232(2) is applied to the third and fourth delay timers 136(3) and 136(4). The second event (pulse) 134(1) is generated when the value of the up counter equals a first compare register value. The third event (pulse) 134(2) is generated when the value of the up counter equals a second compare register value. The external events (pulses) 135(1) and 135(2), generated by current comparison circuits (not explicitly shown) which compare each of the received current sensing inputs SENSE A and SENSE B to a threshold, are applied with the second event (pulse) 134(1) and third event (pulse) 134(2), respectively, to the inputs of the multiplexers 340(1) and 340(2). Selection by the multiplexers 340 between the two input signals is made in response to the selection signals 141(1) and 141(2). Thus, one of the second event (pulse) 134(1) or external event (pulse) 135(1) is applied to the second delay timer 136(2), and one of the third event (pulse) 134(2) or external event (pulse) 135(2) is applied to the fourth delay timer 136(4). This configuration enables the circuit to provide independent control signals with respect to two independent forward conversion stages.

Although FIG. 7 shows the use of a PAL 200 defining interconnections between the comparators and the flip flops, it will be understood that a hardwired circuit interconnection like that shown in FIG. 4A could alternatively be used.

The FIG. 7 implementation has an operational timing diagram similar to that shown in FIG. 6B, except that the pulse that triggers the delay timer 136(4) may be different than the pulse which triggers the delay timer 136(2).

It will be recognized that any of the circuit configurations discussed above for the control circuit 20 can be used to control a dual phase forward converter system such as that shown in FIG. 1A, or alternatively be used to control two independent single phase forward converter systems such as that shown in FIG. 1B.

It will further be recognized that the solutions described herein are scalable with need. For example, consider a circumstance where the power stage has a full bridge design. In this type of circuit, there will be a need to generate four distinct signals for the transistors on the primary side of the transformers T1 and T2, two signals for the active synchronization transistors on the secondary side of the transformers T1 and T2, and one signal for the recirculation path transistor. This is seven total signals. These signals, however, can be provided by adding and connecting additional flip flops 160 and including, if needed, additional delay timers and comparators to control the set and reset operations of those added flip flops.

Figure 8:
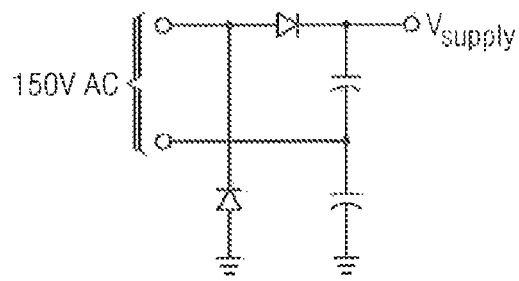
FIG. 8 shows an exemplary circuit for generating the supply voltage Vsupply.

Reference is now made to FIG. 8 which shows an exemplary circuit for generating the supply voltage Vsupply. The circuit includes two diodes and two capacitors connected in the manner shown to an AC input to generate Vsupply.

Figure 9:
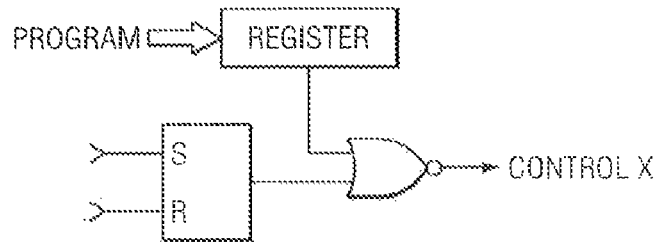
FIG. 9 shows a polarity selecting circuit of the output control signals.

Reference is also made to FIG. 9 which shows a polarity selecting circuit of the output control signals. As discussed above, the CONTROL signal output from each flip flop may need to be selectively inverted in connection with its intended control usage. This is accomplished using an XOR gate having a first input coupled to receive the output of the flip flop and a second input coupled to receive a polarity selection signal. The logic value of this polarity selection signal can be stored at a certain bit location within a register, and applied from the bit location to the second input. In this way, the polarity selection is programmable in a manner similar to how the comparison threshold values are programmable.

Figure 10:
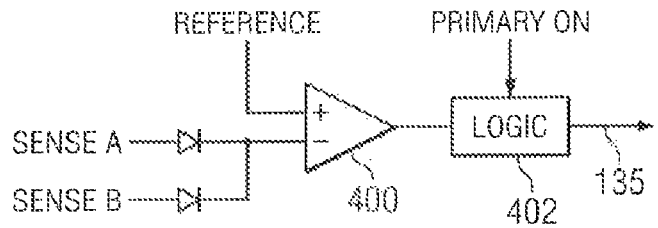
FIGS. 10-12 are circuit diagrams for a current comparison circuit.

Reference is now made to FIG. 10 which shows a circuit diagram of a current comparison circuit. The current sense signals SENSE A and SENSE B from the primary side of the transformers T1 and T2 are received and summed at the positive input of an operational amplifier 400. The positive input of the operational amplifier 400 receives a reference value. The amplifier 400 compares the summed SENSE A and SENSE B signals to the reference value and generates an output indicative of that comparison which is applied to a first input of a logic circuit 402. A second input of the logic circuit 402 receives an input "Primary On" which is indicative of whether the primary winding of either transformer T1 or transformer T2 is being driven. The logic circuit 402 outputs the external event (pulse) 135. That external event (pulse) 135 is logic high if summed SENSE A and SENSE B signals exceed the reference value and either transformer T1 or transformer T2 is being driven.

Figure 11:
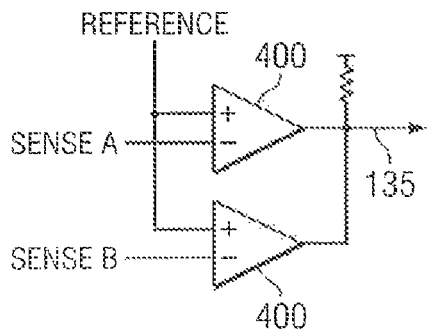
Figure 12:
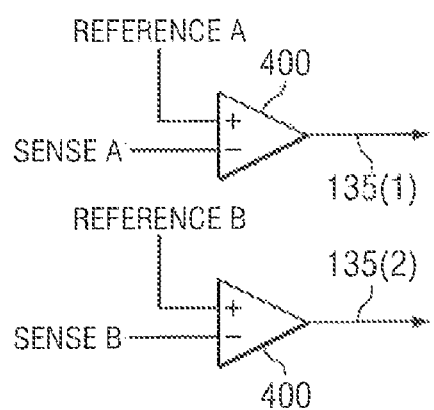

FIGS. 11 and 12 show alternative implementations for the current comparison circuit which also use one or more operational amplifiers 400. FIG. 11 illustrates a circuit where the comparator outputs are combined to generate a single signal 135. FIG. 12 illustrates a circuit where the separate comparators generate separate signals 135(1) and 135(2).

Figure 13:
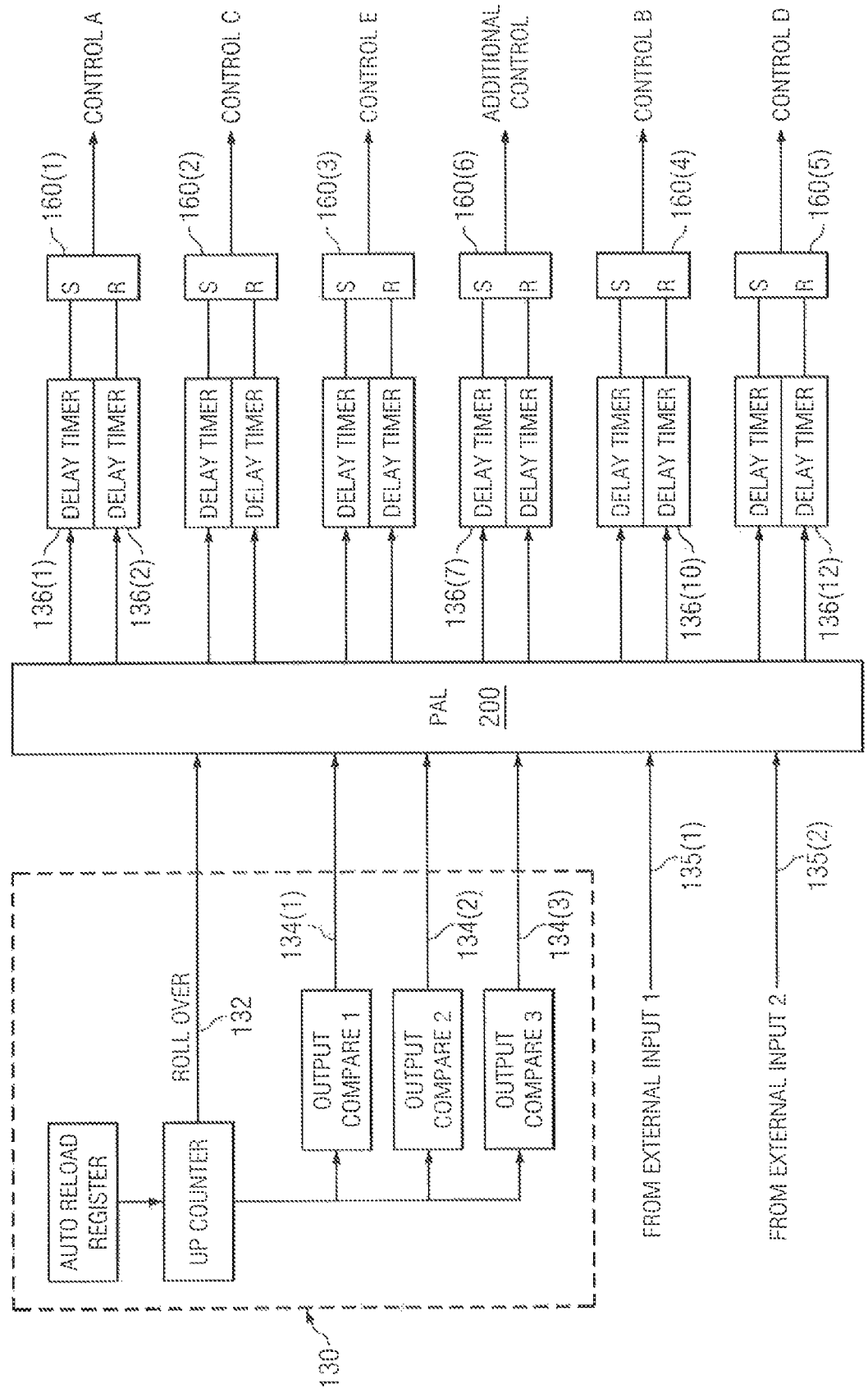
FIG. 13 is a block diagram of a fifth embodiment timer control circuit.

Reference is now made to FIG. 13 wherein there is shown a block diagram of a fifth embodiment timer control circuit. The FIG. 13 implementation does not use comparator (as shown with the previous implementations). Instead, a delay timer 136(1)-136(12) is provided for each of the set and reset inputs to the flip flops 160(1)-160(5).

The combination autoreload register, up counter and multicomparator circuit 130 functions to generate a first event (pulse) 132 when the up counter rolls over; generate a second event (pulse) 134(1) when the value of the up counter equals a first compare register value; generate a third event (pulse) 134(2) when the value of the up counter equals a second compare register value; and generate a fourth event (pulse) 134(3) when the value of the up counter equals a third compare register value. External events (pulses) 135(1) and 135(2) may also be received. These external events (pulses) 135(1) and 135(2) may, for example, be generated by a current comparison circuit (not explicitly shown) which compares the received current sensing inputs SENSE A and SENSE B to one or more thresholds. The events (pulses) 132, 134(1)-134(3) and 135(1)-135(2) are used to trigger (i.e., start) a plurality of delay timers 136(1)-136(12). The PAL 200 interconnects the delay timers 136(1)-136(12) to receive the events (pulses) 132, 134(1)-134(3) and 135(1)-135(2). In this way, the PAL 200 allows the user to select which of the various events (roll over, compare register, or event trigger) will cause the triggering of a certain one of the delay timers 136.

The FIG. 13 implementation has an operational timing diagram similar to that shown in FIG. 4B. In this implementation, a preloadable delay time controls the set and reset of each output latch. The operation of the delay timer is similar to an auto reload timer, except that it stops each time it rolls over (or reaches zero). Each time the delay timer is triggered, the preload value is loaded into the time and the timer counts up (or down) until it rolls over (or reaches zero) and then stops until triggered again. An output pulse sets or resets the output latch when roll over (or zero) reached.

Figure 2B:
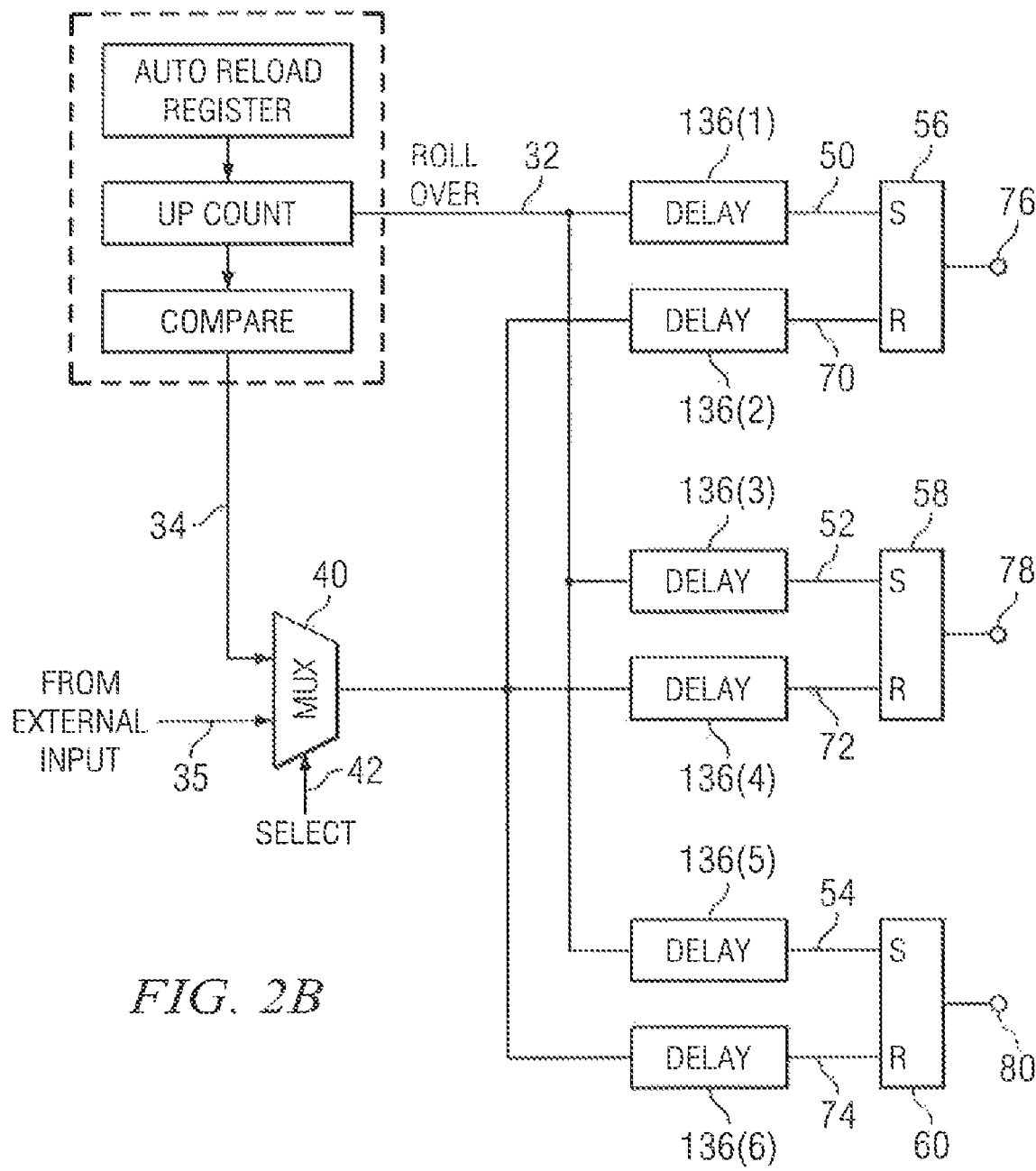

Reference is now made to FIG. 2B which shows a modification of the FIG. 2A circuit to a configuration like that shown in FIG. 13. The delay timers 136(1), 136(3) and 136(5) are triggered by event signal 32 when the up counter rolls over. Responsive to that trigger, each delay timer 136(1), 136(3) and 136(5) delays for its programmed time period and then changes the state of signals 50, 52 and 54 which are applied to the set inputs of the flip flops 56, 58 and 60, respectively. The delay timers 136(2), 136(4) and 136(6) are triggered by event signal 34/35 (as selected by multiplexer 40). This would either be an external input 35 trigger, or a counter signal 34 when the value of the up counter equals a compare register value. Responsive to that trigger, each delay timer 136(2), 136(4) and 136(6) delays for its programmed time period and then changes the state of signals 70, 72 and 74 which are applied to the reset inputs of the flip flops 56, 58 and 60, respectively. The timing diagram of FIG. 3 can also be produced from the circuit FIG. 2B through proper setting of the values for comparison and counting.

While FIG. 1A illustrates a converter implementation of a two transistor type, it will be understood that the timer configurations shown herein could be used to control a number of different types of circuits. With respect to converters, the time configuration could alternatively be used with a flyback converter or a single transistor forward converter. Alternatively, other timed operation circuits, such as with the control of multi-phase motors for example, could be controlled using the described timer circuits.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A circuit, comprising:
   a control circuit configured to generate a first control signal for application to a first control terminal and generate a second control signal for application to a second control terminal, the control circuit comprising:
   a first delay timer configured to be triggered by a first event signal to count and cause a state change of the first control signal;
   a second delay timer configured to be triggered by a second event signal to count and cause an opposite state change of the first control signal;
   a third delay timer configured to be triggered by a third event signal to count and cause a state change of the second control signal; and
   a fourth delay timer configured to be triggered by a fourth event signal to count and cause an opposite state change of the second control signal.

2. The circuit of claim 1, wherein the third event signal is the same as the first event signal and the fourth event signal is the same as the second event signal.

3. The circuit of claim 1, further comprising:
   an up counter; and
   a first comparator coupled to receive a count of the up counter;
   wherein the first event signal is generated responsive to roll over of the up counter; and
   wherein the second event signal is generated by the first comparator detecting a value of the upcounter exceeding a first threshold.

4. The circuit of claim 3, further comprising: a forward converter circuit including a transformer having a primary winding and a secondary winding, a first transistor coupled in series with the primary winding and a second transistor coupled in series with the secondary winding, the first transistor having the first control terminal and the second transistor having the second control terminal.

5. The circuit of claim 3, wherein the control circuit further generates a third control signal for application to a third control terminal, further comprising:
   a fifth timer configured to be triggered by a fifth event signal to count and cause a state change of the third control signal; and
   a sixth timer configured to be trigger by a sixth event signal to count and cause an opposite state change of the third control signal.

6. The circuit of claim 5, wherein the fifth and third event signals are the same as the first event signal and the sixth and fourth event signals are the same as the second event signal.

7. The circuit of claim 5, wherein:
   the first, third and fifth timers comprise first, third and fifth comparators, respectively, each of the first, third and fifth comparators configured to compare a count value output from a first event timer triggered by the first event signal to first, third and fifth thresholds, respectively; and
   the second, fourth and sixth timers comprise second, fourth and sixth comparators, respectively, each of the second, fourth and sixth comparators configured to compare a count value output from a second event timer triggered by the second event signal to second, fourth and sixth thresholds, respectively.

8. The circuit of claim 5, further comprising further comprising a forward converter circuit including a transformer having a primary winding and a secondary winding, a first transistor coupled in series with the primary winding and a second transistor coupled in series with the secondary winding, the first transistor having the first control terminal and the second transistor having the second control terminal, wherein the forward converter circuit further comprises a third transistor coupled in parallel with the secondary winding, the third transistor having the third control terminal.

9. The circuit of claim 1, further comprising an input coupled to receive an external input signal, wherein the second event signal is generated responsive to the external input signal.

10. The circuit of claim 1, wherein:
the first and third timers comprise first and third comparators, respectively, each of the first and third comparators configured to compare a count value output from a first event timer triggered by the first event signal to first and third thresholds, respectively; and
the second and fourth timers comprise second and fourth comparators, respectively, each of the second and fourth comparators configured to compare a count value output from a second event timer triggered by the second event signal to second and fourth thresholds, respectively.

11. A circuit, comprising:
a control circuit configured to generate a first control signal for application to a first control terminal and generate a second control signal for application to a second control terminal, the control circuit comprising:
a first circuit configured to be triggered by a first event signal to delay a state change of the first control signal for a first delay time written to a first register;
a second circuit configured to be triggered by a second event signal to delay an opposite state change of the first control signal for a second delay time written to a second register;
a third circuit configured to be triggered by a third event signal to delay a state change of the second control signal for a third delay time written to a third register; and
a fourth circuit configured to be triggered by a fourth event signal to delay an opposite state change of the second control signal for a fourth delay time written to a fourth register.

12. The circuit of claim 11, further comprising a fifth circuit configured to write the first through fourth delay times to the first through fourth registers, respectively.

13. The circuit of claim 11, wherein the third event signal is the same as the first event signal and the fourth event signal is the same as the second event signal.

14. The circuit of claim 11, further comprising:
an up counter; and
a first comparator coupled to receive a count of the up counter;
wherein the first event signal is generated responsive to roll over of the up counter; and
wherein the second event signal is generated by the first comparator detecting a value of the upcounter exceeding a first threshold written to the first comparator.

15. The circuit of claim 14, further comprising a sixth circuit configured to write the first through fourth delay times to the first through fourth registers, respectively, and write the first threshold to the first comparator.

16. The circuit of claim 14, further comprising: a forward converter circuit including a transformer having a primary winding and a secondary winding, a first transistor coupled in series with the primary winding and a second transistor coupled in series with the secondary winding, the first transistor having the first control terminal and the second transistor having the second control terminal.

17. The circuit of claim 11, wherein:
the first and third circuits comprise first and third comparators, respectively, each of the first and third comparators configured to compare a count value output from a first event timer triggered by the first event signal to first and third delay times, respectively; and
the second and fourth circuits comprise second and fourth comparators, respectively, each of the second and fourth comparators configured to compare a count value output from a second event timer triggered by the second event signal to second and fourth delay times, respectively.

18. A circuit, comprising:
a control circuit configured to generate a first control signal for application to a first control terminal and generate a second control signal for application to a second control terminal, the control circuit comprising:
a first counter triggered by a first event signal;
a second counter triggered by a second event signal;
a first circuit configured to cause a state change of the first control signal in response to a first count of the first counter;
a second circuit configured to cause an opposite state change of the first control signal in response to a first count of the second counter;
a third circuit configured to cause a state change of the second control signal in response to a second count of the first counter; and
a fourth circuit configured to cause an opposite state change of the second control signal in response to a second count of the second counter.

19. The circuit of claim 18, further comprising: a forward converter circuit including a transformer having a primary winding and a secondary winding, a first transistor coupled in series with the primary winding and a second transistor coupled in series with the secondary winding, the first transistor having the first control terminal and the second transistor having the second control terminal.

20. The circuit of claim 18, wherein:
the first and third circuits comprise first and third comparators, respectively, each of the first and third comparators configured to compare a count value output from the first counter to first and second counts of the first counter, respectively; and
the second and fourth circuits comprise second and fourth comparators, respectively, each of the second and fourth comparators configured to compare a count value output from the second counter to the first and second counts of the second counter, respectively.

* * * * *